United States Patent
Dey

(10) Patent No.: US 10,248,402 B2
(45) Date of Patent: Apr. 2, 2019

(54) AUTOMATED CODE DEPLOYMENT SYSTEM

(71) Applicant: Bank of America Corporation, Charlotte, NC (US)

(72) Inventor: Barun Dey, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 241 days.

(21) Appl. No.: 14/588,422

(22) Filed: Jan. 1, 2015

(65) Prior Publication Data

US 2016/0196127 A1    Jul. 7, 2016

(51) Int. Cl.
| | |
|---|---|
| G06F 8/61 | (2018.01) |
| G06F 11/14 | (2006.01) |
| G06F 11/32 | (2006.01) |
| G06F 11/34 | (2006.01) |
| G06F 11/36 | (2006.01) |
| G06F 17/30 | (2006.01) |
| G06F 21/50 | (2013.01) |
| H04L 29/08 | (2006.01) |
| G06F 8/65 | (2018.01) |
| G06F 9/44 | (2018.01) |

(52) U.S. Cl.
CPC .......... *G06F 8/65* (2013.01); *G06F 8/61* (2013.01); *G06F 11/1446* (2013.01); *G06F 11/324* (2013.01); *H04L 67/10* (2013.01); *G06F 11/3476* (2013.01); *G06F 11/3604* (2013.01); *G06F 17/30* (2013.01); *G06F 21/50* (2013.01); *H04L 67/1014* (2013.01)

(58) Field of Classification Search
None
See application file for complete search history.

(56) References Cited

U.S. PATENT DOCUMENTS

| | | | | |
|---|---|---|---|---|
| 8,458,690 | B2* | 6/2013 | Zhang | G06F 8/65 717/171 |
| 8,856,725 | B1* | 10/2014 | Anderson | G06F 8/75 717/103 |
| 9,558,106 | B1* | 1/2017 | Moniz | G06F 11/3688 |
| 2002/0091819 | A1* | 7/2002 | Melchione | H04L 12/24 709/224 |
| 2003/0182301 | A1* | 9/2003 | Patterson | G06F 11/1458 |
| 2003/0182414 | A1* | 9/2003 | O'Neill | G06F 8/65 709/223 |
| 2006/0101449 | A1* | 5/2006 | Gatz | G06F 8/61 717/168 |
| 2011/0029963 | A1* | 2/2011 | Smith | H04L 67/34 717/171 |

* cited by examiner

*Primary Examiner* — Lewis A Bullock, Jr.
*Assistant Examiner* — Bruce S Ashley
(74) *Attorney, Agent, or Firm* — Michael A. Springs; Moore and Van Allen PLLC; Anup Shrinivasan

(57) ABSTRACT

Embodiments of the invention are directed to systems, methods, and computer program products for automated code deployment. In some embodiments, the system is configured to retrieve an updated software code block from a source database; determine one or more edges to install the updated software code block, wherein the one or more edges comprise an existing software code block; and deploy the updated software code block retrieved from the source database to the one or more edges using one or more transport engines.

15 Claims, 4 Drawing Sheets

AUTOMATED CODE DEPLOYMENT SYSTEM

FIELD

In general, embodiments of the invention relate to code deployment, in particular, embodiments of the invention relate to a system to schedule and automate the deployment of code from a centralized server to one or more edges.

BACKGROUND

With increasing demand for faster, more powerful and more efficient ways to store information, optimization of storage technologies is becoming a key challenge. Included in this challenge is a need to optimize the way that computer code, or the instructions for implementing software applications and/or operating the hardware thereby associated, is deployed in various environments. Typically in software development projects, a staging environment is used to test newer versions of a code block after development but prior to production across various platforms. A staging environment is meant to replicate the production environment as close as possible to maximize the chances of identifying one or more bugs before releasing the software code block.

In this regard, there is a need for a centralized system to deploy software code blocks to one or more software environments concurrently.

BRIEF SUMMARY

Embodiments of the present invention address the above needs and/or achieve other advantages by providing apparatuses (e.g., a system, computer program product, and/or other device) and methods for automated code deployment. The present invention enables a centralized code deployment system to deploy a software code block to one or more servers in a software environment. The system may be configured to automate software code block deployment by scheduling the deployment without any human intervention.

In one aspect, a system for automated code deployment is presented. The system comprises a computing platform including one or more computing processors, a memory in communication with the processor; a module stored in the memory, executable by a processor and configured to: retrieve an updated software code block from a source database; determine one or more edges to install the updated software code block, wherein the one or more edges comprise an existing software code block; and deploy the updated software code block retrieved from the source database to the one or more edges using one or more transport engines.

In some embodiments, the one or more edges comprises one or more servers associated with at least one of a testing environment, user acceptance test environment, staging environment, and production environment.

In some embodiments, the module is further configured to replicate the updated software code block from the source database in the one or more edges, wherein replicating further comprises: deleting the existing software code block in the one or more edges; and installing the updated software code block in the one or more edges.

In some embodiments, the module is further configured to purge the one or more edges, wherein purging further comprises deleting the existing software code block from the one or more edges.

In some embodiments, the module is further configured to retrieve the existing software code block from the one or more edges; store the retrieved existing software code block in a back-up database; and install the updated software code block in the one or more edges.

In some embodiments, the module is further configured to determine that the updated software code block in the one or more edges is malfunctioning; retrieve from the back-up database the existing software code block associated with the one or more edges determined to be malfunctioning; and deploy the retrieved existing software code block to the one or more edges determined to be malfunctioning.

In some embodiments, the module is configured to initiate the presentation of a user interface, wherein the user interface comprises at least one of a status of the deployment, a unique identifier associated with the deployment, a unique identifier associated with the one or more edges, a source database, a time associated with the deployment, a job type and a deployment priority.

In some embodiments, the job type comprises at least one of an upload, a download, or a distribution.

In some embodiments, the module is further configured to enable a user to schedule in advance, the deployment of the updated software code block based on at least a trigger, wherein the trigger comprises at least a time or an event.

In another aspect, a method for automated code deployment is presented. The method comprises retrieving, using a computing device processor, an updated software code block from a source database; determining, using a computing device processor, one or more edges to install the updated software code block, wherein the one or more edges comprise an existing software code block; deploying, using a computing device processor, the updated software code block retrieved from the source database to the one or more edges using one or more transport engines.

In yet another aspect, a computer program product for automated code deployment is presented. The computer program product comprising a non-transitory computer-readable medium comprising code causing a first apparatus to retrieve an updated software code block from a source database; determine one or more edges to install the updated software code block, wherein the one or more edges comprise an existing software code block; and deploy the updated software code block retrieved from the source database to the one or more edges using one or more transport engines.

BRIEF DESCRIPTION OF THE DRAWINGS

Figure 1:
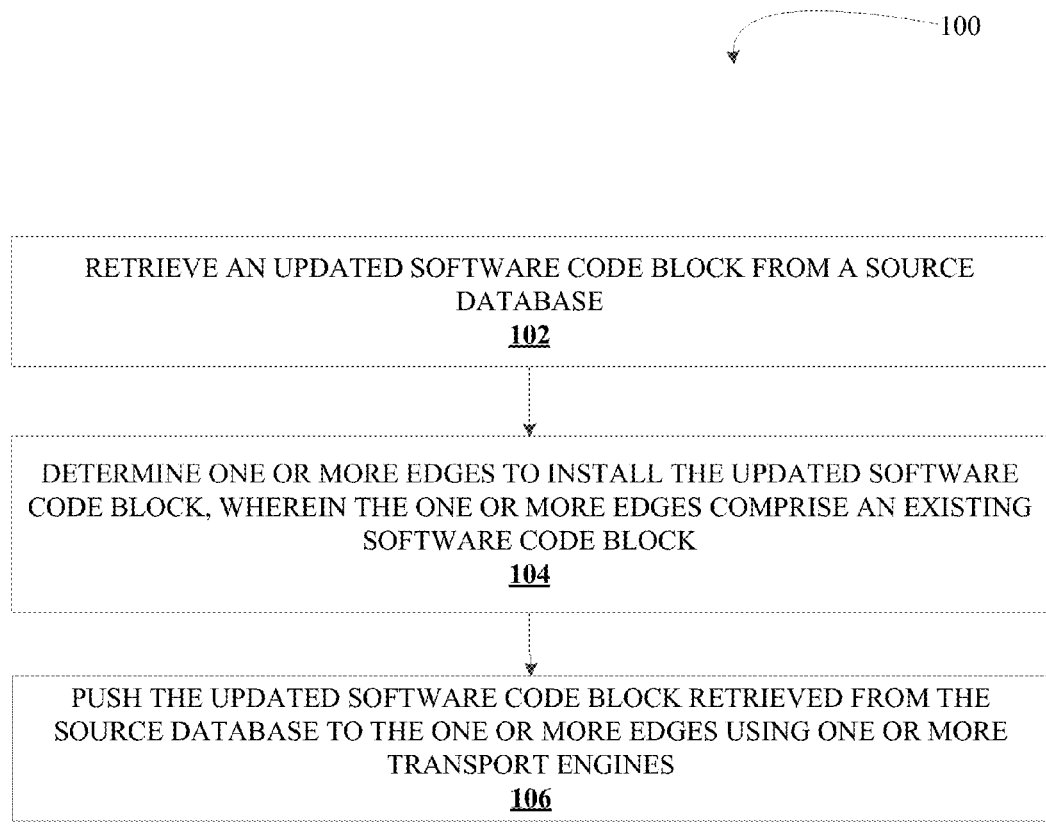

Having thus described embodiments of the invention in general terms, reference will be made to the accompanying drawings, where:

FIG. 1 presents a high level process flow for an automated code deployment system in accordance with an embodiment of the invention in accordance with an embodiment of the invention.

Figure 2:
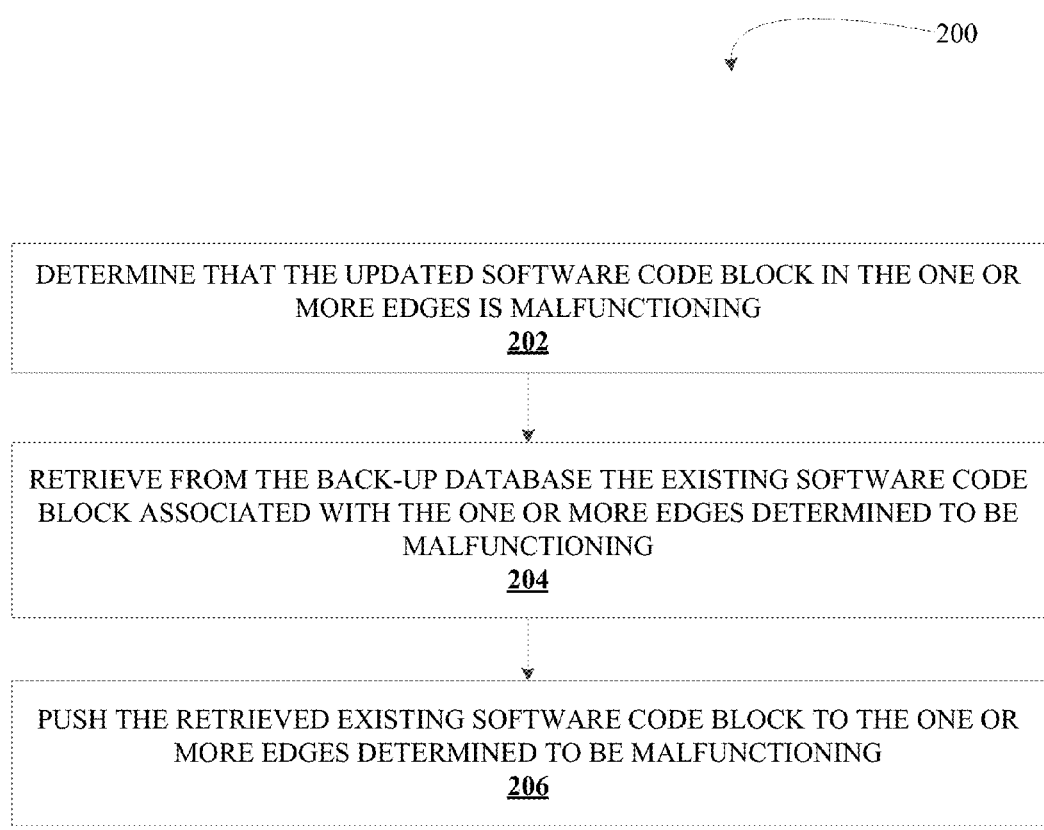

FIG. 2 illustrates a high level process flow for a software roll-back in accordance with an embodiment of the invention.

Figure 3:
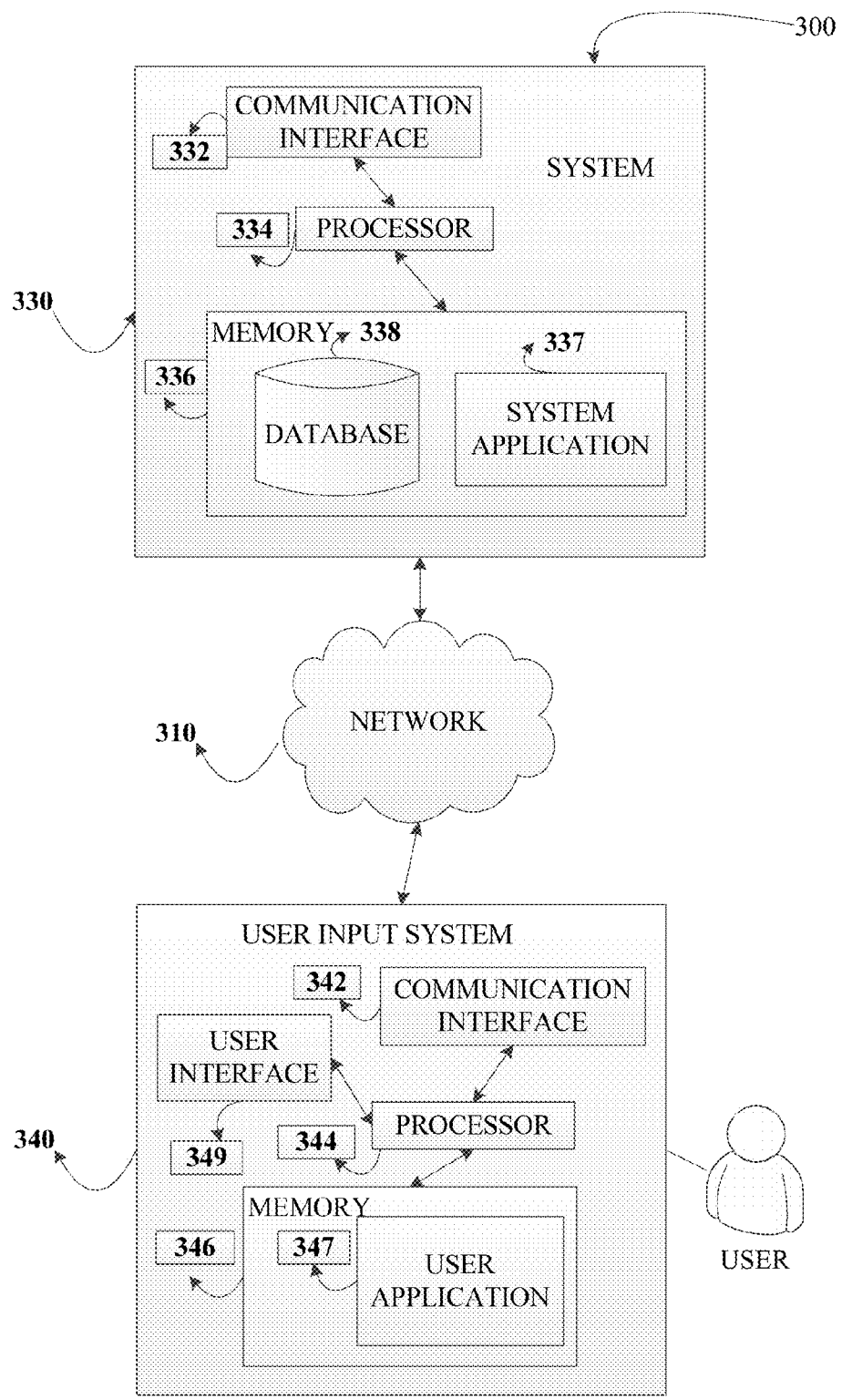

FIG. 3 presents an exemplary block diagram of the system environment in accordance with embodiments of the invention.

Figure 4:
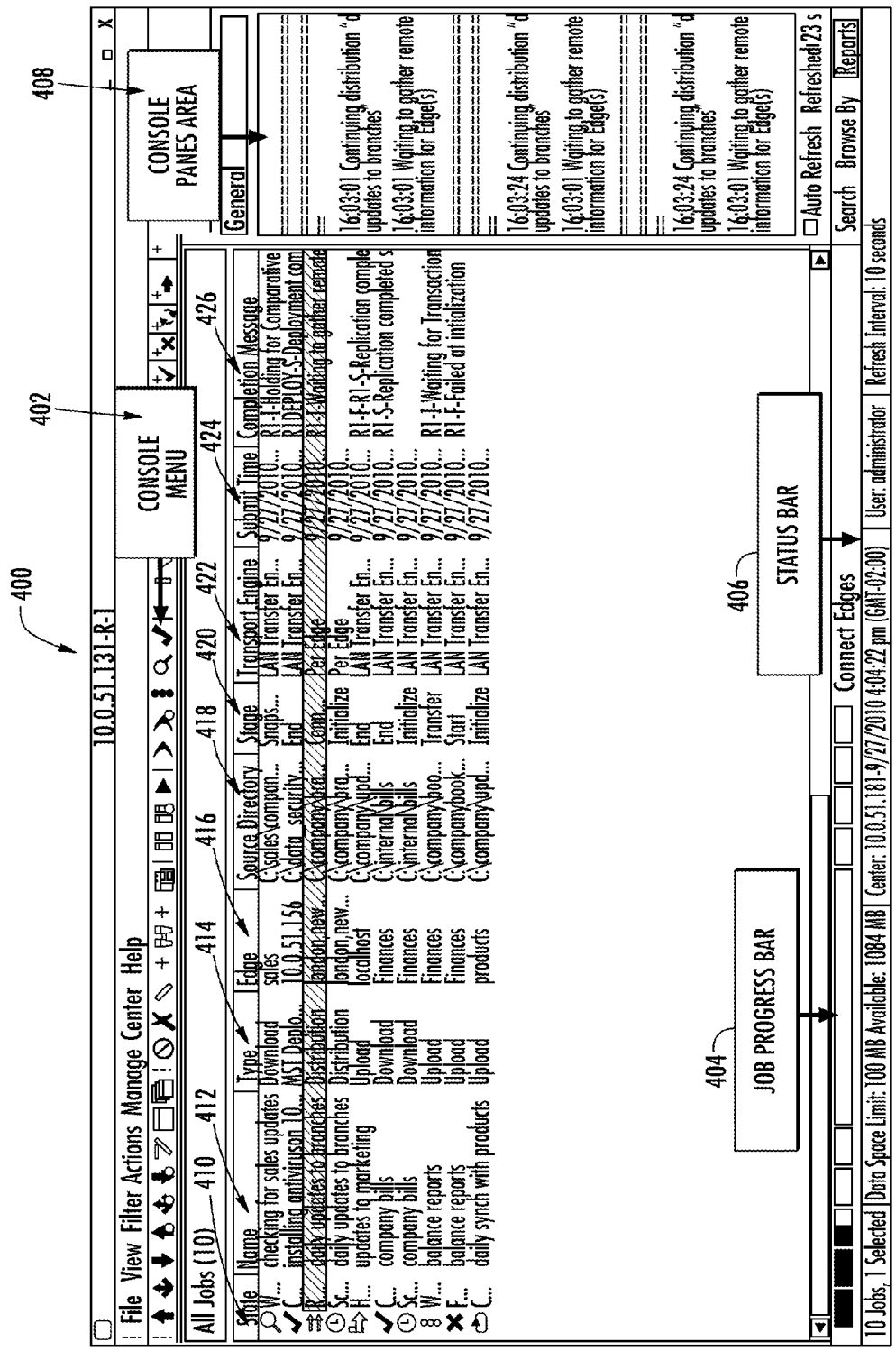

FIG. 4 illustrates an exemplary user interface to schedule and deploy software code blocks to one or more edges in accordance with an embodiment of the invention.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Typically, a development environment is where software is developed. The development environment includes a collection of procedures and tools for developing, testing, and debugging a software program. The development environment generally includes three server tiers, namely, software development environment, staging environment, and production environment. In some embodiments, the development environment is where the developer tests a software code block and checks whether the software runs successfully with that code block. In some embodiments the software development environment may be a developer's desktop. In some other embodiment, the software development environment may be a server shared by several developers working together on the same project. The staging environment is an intermediary environment typically designed to resemble the production server environment. In this regard, the software code block is tested in the staging environment using one or more servers to check for reliability and to ensure seamless functionality in the production environment. Typically, a software code block is subjected to a rigorous approval system in the staging environment. In some embodiments, the production environment goes out to the world to become production.

In software development projects, staging occurs twice: (1) when the software code block is initially deployed in a testing environment after development and (2) when the software code block is deployed to the production environment after adequate testing and approval in the test environment. Typically, each environment comprises one or more servers configured to host a software application. In some embodiments, the software code block may be an update to the existing software code in the one or more servers. In another embodiment, the software code block may be used to replace the existing software code in the one or more servers.

FIG. 1 presents a high level process flow for an automated code deployment system in accordance with an embodiment of the invention 100. As shown in block 102, the process flow includes retrieving an updated software code block from a source database. In response, the process flow includes determining one or more edges to install the update software code block, wherein the one or more edges comprise an existing software code block, as shown in block 104. In response to determining the one or more edges, deploy the updates software code block retrieved from the source database to the one or more edges using one or more transport engines, as shown in block 106.

As used herein, a "software code block" may refer to a sequence of software instructions written as a formal plan of the software, expressing intent in maximal detail. Typically, a software code block can be written in any of the hundreds of programming languages that have been developed. Some of the most popular of these are C, C++, Cobol, Fortran, Java, Perl, PHP, Python, or the like. There are many programs that can be used for writing source code in the desired programming language, ranging from simple, general purpose text editors to integrated development environments. After writing, the source code is saved in a source database in a single file or, more commonly, in multiple files, with the number of files depending on factors such as the programming language and the size of the software project. Very often, the software code block intended for use on one platform needs to be written on another platform. A platform may be any combination of processor and/or operating system.

Typically, a software deployment process includes development, testing, staging, and production environments. In this regard, a software code block is required to complete each stage in the deployment process in a discrete environment, separate from the other environments. The need therefore exists for dedicated resources to oversee the integration and flow of development, testing, staging, and production of these systems. In this regard, the software deployment process may face numerous challenges such as defects in the code block, issues, risks, change requests, new development requests (additional features and functions), new development tasks, or the like. In some embodiments, the software code block may be new systems or major function blocks delivered through major programs or projects. In some other embodiments, the software code block may be routine minor enhancements in the form of business as usual (BAU) change requests. In yet another embodiment, the software code block may be minor defect fixes in the form of business as usual (BAU) service requests.

As used herein, an "edge" may refer to one or more servers associated with each environment. In some embodiments, each of the one or more servers may be configured to be associated with any of the one or more environments. In one aspect, each of the one or more edges may be configured to test and measure the performance of the software code block, as a stand-alone software code block, or in combination with one or more other aspects of a software application. In this regard, the present invention provides the functional benefit of scheduling and automating a software code block to be deployed or pushed to one or more edges in the one or more environments simultaneously.

In one aspect, the one or more edges have an existing software code block already installed. In this regard, the system may be configured to delete the existing software code block in the one or more edges and install the updated software code block in the one or more edges. In essence, the software code blocks installed in the one or more edges mirror the software code block retrieved from the source database. In some embodiments, the system may be configured to capture a snapshot of the source database and the one or more edges. In this regard, the system may be configured to capture listing file sizes, modification times and dates, security permissions, and sharing (when applicable) configuration. In response to receiving a snapshot of the source database and the one or more edges, the system may then be configured to determine the absolute minimum to be transferred from the source database to the one or more edges configured to mirror the software code block from the source database.

In another aspect, the existing software code blocks from the one or more edges are retrieved as a back-up option. In this regard, the existing software code blocks may be stored in a back-up database prior to the code deployment. In yet another aspect, the system may be configured to purge the one or more edges. In this regard, the system may be configured to delete the existing software code block from the one or more edges.

In one aspect, the system may be configured to determine one or more transport engines to enable deployment of the updated software code block from the source database based on at least a geographic location of the one or more edges. In this regard, the system may be configured to determine the location of the one or more edges based on at least a geo-positioning system (GPS), an internet protocol (IP) address, or the like.

FIG. 2 illustrates a high level process flow for a software roll-back 200. As shown in block 202, the process flow includes determining that the updated software code block in the one or more edges is malfunctioning. In response, the process flow includes retrieving from the back-up database, the existing software code block associated with the one or more edges determined to be malfunctioning, as shown in block 204. The retrieved existing software code block is then deployed to the one or more edges determined to be malfunctioning, as shown in block 206.

Typically, the software deployment process often involves a great deal of collaboration and orchestration. In one aspect, certain software applications may require multiple deployment candidates and perhaps an alpha and/or a beta program prior to production. In another aspect, certain web-based software applications may require software code block updates with minimal downtime and best possible transition. In this regard, overall software stability and maintenance review is imperative. In some embodiments, the deployment of an updated software code block may cause one or more errors resulting in loss of one or more functionality of the one or more edges. In this regard, the system may be configured to retrieve from the source database, the existing software code block associated with each of the one or more malfunctioning edges and revert the one or more edges' functionality accordingly, until the source of the malfunction is identified. In this way, the system may be configured to minimize downtime.

Generally, deploying a software code block is a complex process which tends to be unreliable when handled manually. The present invention provides the functional benefit of automating the deployment process by scheduling in advance, one or more deployment protocols to initiate the transfer of a software code block retrieved from a source database to one or more edges in the one or more environments. In this way, the system may be configured to enable the user to efficiently plan, manage, and rapidly deliver changes into the one or more edges in the one or more environments. In some embodiments, the software roll-back may be based on a specific point-in-time. In some other embodiments, the software roll-back may be based on a specific software code block installation.

As used herein, a "user" may be any individual associated with the software code block deployment process. In this regard, the user may be a developer, a release manager, a system administrator, a quality assurance analyst, a test manager, or the like. In some embodiments, the user may be any individual with authorized access to the automated code deployment user interface.

FIG. 3 presents an exemplary block diagram of the system environment 300 for implementing the process flows described herein in accordance with embodiments of the present invention. As illustrated, the system environment 300 includes a network 310, a system 330, and a user input system 340. Also shown in FIG. 3 is a user of the user input system 340. The user input system 340 may be a mobile device or other non-mobile computing device. The user may be a person who uses the user input system 340 to execute a user application 347. The user application 347 may be an application to communicate with the system 330, perform a transaction, input information onto a user interface presented on the user input system 340, or the like. The user application 347 and/or the system application 337 may incorporate one or more parts of any process flow described herein.

As shown in FIG. 3, the system 330, and the user input system 340 are each operatively and selectively connected to the network 310, which may include one or more separate networks. In addition, the network 310 may include a telecommunication network, local area network (LAN), a wide area network (WAN), and/or a global area network (GAN), such as the Internet. It will also be understood that the network 310 may be secure and/or unsecure and may also include wireless and/or wired and/or optical interconnection technology.

The user input system 340 may include any computerized apparatus that can be configured to perform any one or more of the functions of the user input system 340 described and/or contemplated herein. For example, the user may use the user input system 340 to transmit and/or receive information or commands to and from the system 330. In some embodiments, for example, the user input system 340 may include a personal computer system (e.g. a non-mobile or non-portable computing system, or the like), a mobile computing device, a personal digital assistant, a mobile phone, a tablet computing device, a network device, and/or the like. As illustrated in FIG. 3, in accordance with some embodiments of the present invention, the user input system 340 includes a communication interface 342, a processor 344, a memory 346 having an user application 347 stored therein, and a user interface 349. In such embodiments, the communication interface 342 is operatively and selectively connected to the processor 344, which is operatively and selectively connected to the user interface 349 and the memory 346. In some embodiments, the user may use the user application 347 to execute processes described with respect to the process flows described herein. Specifically, the user application 347 executes the process flows described herein.

Each communication interface described herein, including the communication interface 342, generally includes hardware, and, in some instances, software, that enables the user input system 340, to transport, send, receive, and/or otherwise communicate information to and/or from the communication interface of one or more other systems on the network 310. For example, the communication interface 342 of the user input system 340 may include a wireless transceiver, modem, server, electrical connection, and/or other electronic device that operatively connects the user input system 340 to another system such as the system 330. The wireless transceiver may include a radio circuit to enable wireless transmission and reception of information. Additionally, the user input system 340 may include a positioning system. The positioning system (e.g. a global positioning system (GPS), a network address (IP address) positioning system, a positioning system based on the nearest cell tower location, or the like) may enable at least the user input system 340 or an external server or computing device in communication with the user input system 340 to determine the location (e.g. location coordinates) of the user input system 340.

Each processor described herein, including the processor 344, generally includes circuitry for implementing the audio, visual, and/or logic functions of the user input system 340. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 347 of the memory 346 of the user input system 340.

Each memory device described herein, including the memory 346 for storing the user application 347 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 346 includes the user application 347. In some embodiments, the user application 347 includes an interface for communicating with, navigating, controlling, configuring, and/or using the user input system 340. In some embodiments, the user application 347 includes computer-executable program code portions for instructing the processor 344 to perform one or more of the functions of the user application 347 described and/or contemplated herein. In some embodiments, the user application 347 may include and/or use one or more network and/or system communication protocols.

Also shown in FIG. 3 is the user interface 349. In some embodiments, the user interface 349 includes one or more output devices, such as a display and/or speaker, for presenting information to the user. In some embodiments, the user interface 349 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 349 includes the input and display devices of a mobile device, which are operable to receive and display information.

FIG. 3 also illustrates a system 330, in accordance with an embodiment of the present invention. The system 330 may refer to the "apparatus" described herein. The system 330 may include any computerized apparatus that can be configured to perform any one or more of the functions of the system 330 described and/or contemplated herein. In accordance with some embodiments, for example, the system 330 may include a computer network, an engine, a platform, a server, a database system, a front end system, a back end system, a personal computer system, and/or the like. Therefore, the system 330 may be a server managed by the business. The system 330 may be located at the facility associated with the business or remotely from the facility associated with the business. In some embodiments, such as the one illustrated in FIG. 3, the system 330 includes a communication interface 332, a processor 334, and a memory 336, which includes a system application 337 and a structured database 338 stored therein. As shown, the communication interface 332 is operatively and selectively connected to the processor 334, which is operatively and selectively connected to the memory 336.

It will be understood that the system application 337 may be configured to implement any one or more portions of the various user interfaces and/or process flow described herein. The system application 337 may interact with the user application 347. It will also be understood that, in some embodiments, the memory includes other applications. It will also be understood that, in some embodiments, the system application 337 is configured to communicate with the structured database 338, the user input system 340, or the like.

It will be further understood that, in some embodiments, the system application 337 includes computer-executable program code portions for instructing the processor 334 to perform any one or more of the functions of the system application 337 described and/or contemplated herein. In some embodiments, the system application 337 may include and/or use one or more network and/or system communication protocols.

In addition to the system application 337, the memory 336 also includes the structured database 338. As used herein, the structured database 338 may be one or more distinct and/or remote databases. In some embodiments, the structured database 338 is not located within the system and is instead located remotely from the system. In some embodiments, the structured database 338 stores information or data described herein.

It will be understood that the structured database 338 may include any one or more storage devices, including, but not limited to, datastores, databases, and/or any of the other storage devices typically associated with a computer system. It will also be understood that the structured database 338 may store information in any known way, such as, for example, by using one or more computer codes and/or languages, alphanumeric character strings, data sets, figures, tables, charts, links, documents, and/or the like. Further, in some embodiments, the structured database 338 may include information associated with one or more applications, such as, for example, the system application 337. It will also be understood that, in some embodiments, the structured database 338 provides a substantially real-time representation of the information stored therein, so that, for example, when the processor 334 accesses the structured database 338, the information stored therein is current or substantially current.

It will be understood that the embodiment of the system environment illustrated in FIG. 3 is exemplary and that other embodiments may vary. As another example, in some embodiments, the system 330 includes more, less, or different components. As another example, in some embodiments, some or all of the portions of the system environment 300 may be combined into a single portion. Likewise, in some embodiments, some or all of the portions of the system 330 may be separated into two or more distinct portions.

In addition, the various portions of the system environment 300 may be maintained for and/or by the same or separate parties. It will also be understood that the system 330 may include and/or implement any embodiment of the present invention described and/or contemplated herein. For example, in some embodiments, the system 330 is configured to implement any one or more of the embodiments of the process flows described and/or contemplated herein in connection any process flow described herein. Additionally, the system 330 or the user input system 340 is configured to initiate presentation of any of the user interfaces described herein.

FIG. 4 illustrates an exemplary user interface to schedule and deploy software code blocks to one or more edges 400. As shown, the user interface comprises a console menu 402, a job progress bar 404, a status bar 406, and a console pane area 408. In some embodiments, the console menu 402 may be configured to enable the user to manipulate one or more jobs. For purposes of the invention, a "job" may refer to a software code block release or deployment. In one aspect, the user interface 400 may enable a user to configure a job, wherein configuring a job may include determining at least a source database, one or more edges, a schedule time, and one or more transport engines. In response to configuring a job using the console menu 402, the user interface 400 may enable the user to monitor the job progress using the job progress bar 404 and the status of the job using the status bar 406. In some embodiments, the user interface 400 may be configured to present one or more messages associated the job to the user using the console pane area 408.

In some embodiments, once the job is configured, the user interface 400 may be configured to present at least a state of the job 410, a job name 412, a job type 414, one or more edges associated with the job 416 444, a source database 418, a job stage 420, a transport engine used to execute the job 422, a submit time 424, and a completion message 426. In one aspect, the one or more states 410 associated with the job may include, but not limited to, currently executing, successfully executed, scheduled, incomplete, or the like. Essentially, the one or more states represent a current status of the job. In another aspect, the one or more job types 414 include an upload, a download, and a distribution. In some embodiments, an upload is an indication of a job that may be configured to deploy an updated software code block from a source database to a single edge in the one or more environments. In some other embodiments, a download is an indication of a job that may be configured to retrieve the existing software code block from a single edge in the one or more environments to be stored in a back-up database. In yet another embodiment, a distribution job is an indication of a job that may be configured to deploy an updated software code block from a source database to one or more edges. In this regard, a job may be configured to complete a combination of job types. In some embodiments, the one or more stages 420 associated with the completion of a job includes at least initialize, start, connect, transfer, snapshot and end. Typically, the one or more stages 420 are associated with at least the status of the job and the job type. In this regard, an end stage may be associated with a successfully executed job, an initialize stage may be associated with a scheduled job indicating the need to initialize the one or more edges, a snapshot stage may be associated with an upload or a download job type.

In some embodiments, the system may be configured to initiate the presentation of the user interface 400 to a user based on at least a successful verification of one or more authentication credentials associated with the user. In one aspect, the system may be configured to enable the user to access the user interface 400 from a remote computer.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for automated code deployment, the system comprising:
   at least one non-transitory storage device;
   at least one processor; and
   at least one module stored in said memory and comprising instruction code that is executable by the at least one processor and configured to cause said at least one processor to:
   retrieve an updated software code block from a source database;
   in response to retrieving the updated software code block, generate the presentation of a user interface, wherein the user interface comprises at least a status of potential deployment of the updated software code block, a unique identifier associated with the potential deployment, a unique identifier associated with the one or more edges for the potential deployment, a source database associated with the potential deployment, a time associated with the deployment, a job type and a deployment priority, and wherein the job type comprises at least one of an upload, a download, or a distribution;
   subsequently to the retrieving, determine one or more edges to install the updated software code block, wherein the one or more edges comprise:
      an existing software code block,
      one or more servers associated with at least one of a testing environment, user acceptance test environment, staging environment, and production environment,
         wherein the one or more servers are configured to test and measure the performance of the software code block;
   in response to determining the one or more edges, updating the user interface with the determined unique identifiers associated with the determined one or more edges;
   subsequently to determining the edges, capture a snapshot of the source database and the one or more edges, wherein the snapshot comprises one or more listing file sizes, modification times and dates, security permissions, and sharing configuration;
   in response to capturing a snapshot, updating the user interface to identify the source database associated with the potential deployment;
   based on the snapshot of the source database and the one or more edges, determine a minimum code to transfer from the source database to the one or more edges so that the edges mirror the updated software code block from the source database, wherein the minimum code is the difference between the existing software code block and the updated software code block;
   determine one or more transport engines to enable deployment of the minimum code, wherein determining one or more transport engines comprises retrieving the geographic location of the one or more edges;
   in response to determining the minimum code and the transport engines, performing the steps of:
      updating the user interface to initialize a status of the deployment of the minimum code, a unique identifier associated with the deployment of the minimum code and a job type associated with the deployment;
      retrieve the existing software code block from the one or more edges; and
      store the retrieved existing software code block in a back-up database prior to deploying the minimum code;

based on determining the minimum code to transfer and determining one or more transport engines, automatically deploy the minimum code retrieved from the source database to the one or more edges using the one or more transport engines;

in response to automatically deploying the minimum code, updating the user interface to a new status in regards to the deployment;

subsequent to the deploying, install the updated software code block in the one or more edges;

in response to the installing, updating the user interface to a new status in regards to the deployment;

determine that the updated software code block in the one or more edges is malfunctioning;

in response to the determined malfunction, retrieve, from the back-up database, the stored software code block previously associated with the one or more edges determined to be malfunctioning and automatically revert the one or more malfunctioning edges with the retrieved stored software code block and update the user interface with the new status.

2. The system of claim 1, wherein the instruction code of said module for causing the at least one processor to replicate the updated software code block from the source database in the one or more edges, wherein replicating further comprises:

deleting the existing software code block in the one or more edges; and installing the minimum code in the one or more edges.

3. The system of claim 1, wherein the instruction code of said module for causing the at least one processor to purge the one or more edges, wherein purging further comprises deleting the existing software code block from the one or more edges.

4. The system of claim 1, wherein the instruction code of said module for causing the at least one processor to enable a user to schedule in advance, the deployment of the minimum code based on at least a trigger, wherein the trigger comprises at least a time or an event.

5. The system of claim 1, wherein retrieving the geographic location of the one or more edges comprises retrieving the geographic location from a geo-positioning system (GPS).

6. A computer implemented method for automated code deployment, the method comprising:

retrieve an updated software code block from a source database;

in response to retrieving the updated software code block, generate the presentation of a user interface, wherein the user interface comprises at least a status of potential deployment of the updated software code block, a unique identifier associated with the potential deployment, a unique identifier associated with the one or more edges for the potential deployment, a source database associated with the potential deployment, a time associated with the deployment, a job type and a deployment priority, and wherein the job type comprises at least one of an upload, a download, or a distribution;

subsequently to the retrieving, determine one or more edges to install the updated software code block, wherein the one or more edges comprise:

an existing software code block, one or more servers associated with at least one of a testing environment, user acceptance test environment, staging environment, and production environment, wherein the one or more servers are configured to test and measure the performance of the software code block;

in response to determining the one or more edges, updating the user interface with the determined unique identifiers associated with the determined one or more edges;

subsequently to determining the edges, capture a snapshot of the source database and the one or more edges, wherein the snapshot comprises one or more listing file sizes, modification times and dates, security permissions, and sharing configuration;

in response to capturing a snapshot, updating the user interface to identify the source database associated with the potential deployment;

based on the snapshot of the source database and the one or more edges, determine a minimum code to transfer from the source database to the one or more edges so that the edges mirror the updated software code block from the source database, wherein the minimum code is the difference between the existing software code block and the updated software code block;

determine one or more transport engines to enable deployment of the minimum code, wherein determining one or more transport engines comprises retrieving the geographic location of the one or more edges;

in response to determining the minimum code and the transport engines, performing the steps of:

updating the user interface to initialize a status of the deployment of the minimum code, a unique identifier associated with the deployment of the minimum code and a job type associated with the deployment;

retrieve the existing software code block from the one or more edges; and store the retrieved existing software code block in a back-up database prior to deploying the minimum code;

based on determining the minimum code to transfer and determining one or more transport engines, automatically deploy the minimum code retrieved from the source database to the one or more edges using the one or more transport engines;

in response to automatically deploying the minimum code, updating the user interface to a new status in regards to the deployment;

subsequent to the deploying, install the updated software code block in the one or more edges;

in response to the installing, updating the user interface to a new status in regards to the deployment;

determine that the updated software code block in the one or more edges is malfunctioning;

in response to the determined malfunction, retrieve, from the back-up database, the stored software code block previously associated with the one or more edges determined to be malfunctioning and automatically revert the one or more malfunctioning edges with the retrieved stored software code block and update the user interface with the new status.

7. The method of claim 6 further comprises replicating the updated software code block from the source database in the one or more edges, wherein replicating further comprises:

deleting the existing software code block in the one or more edges; and installing the minimum code in the one or more edges.

8. The method of claim 6 further comprises:
purging the one or more edges, wherein purging further comprises deleting the existing software code block from the one or more edges.

9. The method of claim 6 further comprises:
enabling a user to schedule in advance, the deployment of the minimum code based on at least a trigger, wherein the trigger comprises at least a time or an event.

10. The method of claim 6, wherein retrieving the geographic location of the one or more edges comprises retrieving the geographic location from a geo-positioning system (GPS).

11. A computer program product for automated code deployment, the computer program product comprising a non-transitory computer-readable medium comprising code causing a first apparatus to:
retrieve an updated software code block from a source database;
in response to retrieving the updated software code block, generate the presentation of a user interface, wherein the user interface comprises at least a status of potential deployment of the updated software code block, a unique identifier associated with the potential deployment, a unique identifier associated with the one or more edges for the potential deployment, a source database associated with the potential deployment, a time associated with the deployment, a job type and a deployment priority, and wherein the job type comprises at least one of an upload, a download, or a distribution;
subsequently to the retrieving, determine one or more edges to install the updated software code block, wherein the one or more edges comprise:
an existing software code block,
one or more servers associated with at least one of a testing environment, user acceptance test environment, staging environment, and production environment,
wherein the one or more servers are configured to test and measure the performance of the software code block;
in response to determining the one or more edges, updating the user interface with the determined unique identifiers associated with the determined one or more edges;
subsequently to determining the edges, capture a snapshot of the source database and the one or more edges, wherein the snapshot comprises one or more listing file sizes, modification times and dates, security permissions, and sharing configuration;
in response to capturing a snapshot, updating the user interface to identify the source database associated with the potential deployment;
based on the snapshot of the source database and the one or more edges, determine a minimum code to transfer from the source database to the one or more edges so that the edges mirror the updated software code block from the source database, wherein the minimum code is the difference between the existing software code block and the updated software code block;
determine one or more transport engines to enable deployment of the minimum code, wherein determining one or more transport engines comprises retrieving the geographic location of the one or more edges;
in response to determining the minimum code and the transport engines, performing the steps of:
updating the user interface to initialize a status of the deployment of the minimum code, a unique identifier associated with the deployment of the minimum code and a job type associated with the deployment;
retrieve the existing software code block from the one or more edges; and
store the retrieved existing software code block in a back-up database prior to deploying the minimum code;
based on determining the minimum code to transfer and determining one or more transport engines, automatically deploy the minimum code retrieved from the source database to the one or more edges using the one or more transport engines;
in response to automatically deploying the minimum code, updating the user interface to a new status in regards to the deployment;
subsequent to the deploying, install the updated software code block in the one or more edges;
in response to the installing, updating the user interface to a new status in regards to the deployment;
determine that the updated software code block in the one or more edges is malfunctioning;
in response to the determined malfunction, retrieve, from the back-up database, the stored software code block previously associated with the one or more edges determined to be malfunctioning and
automatically revert the one or more malfunctioning edges with the retrieved stored software code block and update the user interface with the new status.

12. The computer program product of claim 11, wherein the first apparatus is further configured to replicate the updated software code block from the source database in the one or more edges, wherein replicating further comprises:
deleting the existing software code block in the one or more edges; and installing the minimum code in the one or more edges.

13. The computer program product of claim 11, wherein the first apparatus is further configured to:
purge the one or more edges, wherein purging further comprises deleting the existing software code block from the one or more edges.

14. The computer program product of claim 11, wherein the first apparatus is further configured to:
enable a user to schedule in advance, the deployment of the minimum code based on at least a trigger, wherein the trigger comprises at least a time or an event.

15. The computer program product of claim 11, wherein retrieving the geographic location of the one or more edges comprises retrieving the geographic location from a geo-positioning system (GPS).

* * * * *